April 16, 1957 E. HAGENLOCHER ET AL 2,788,650
FLEXIBLE COUPLINGS
Filed March 31, 1952 3 Sheets-Sheet 1

Inventors
Ernest Hagenlocher
Glenn C. Werner
By
Attorneys

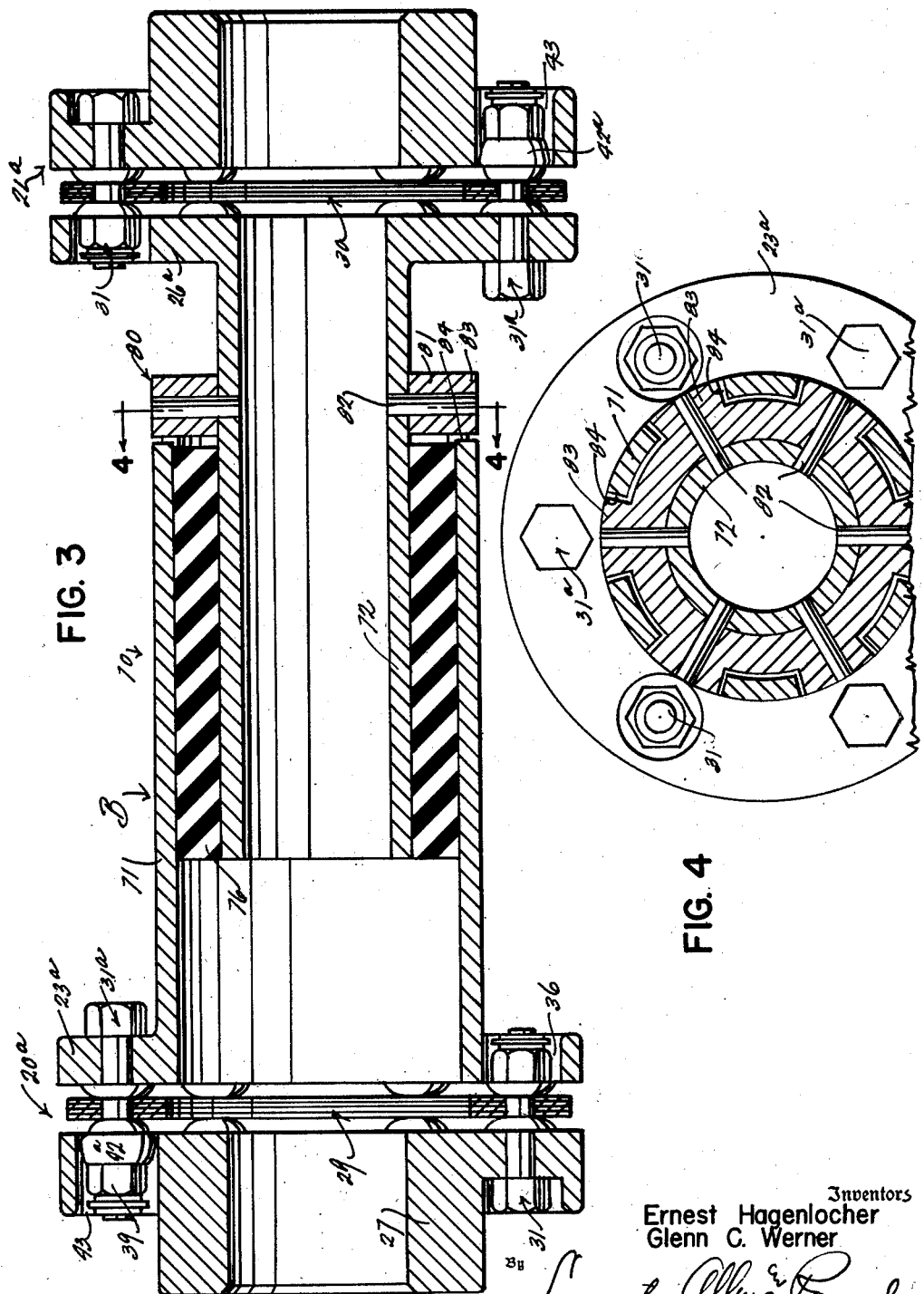

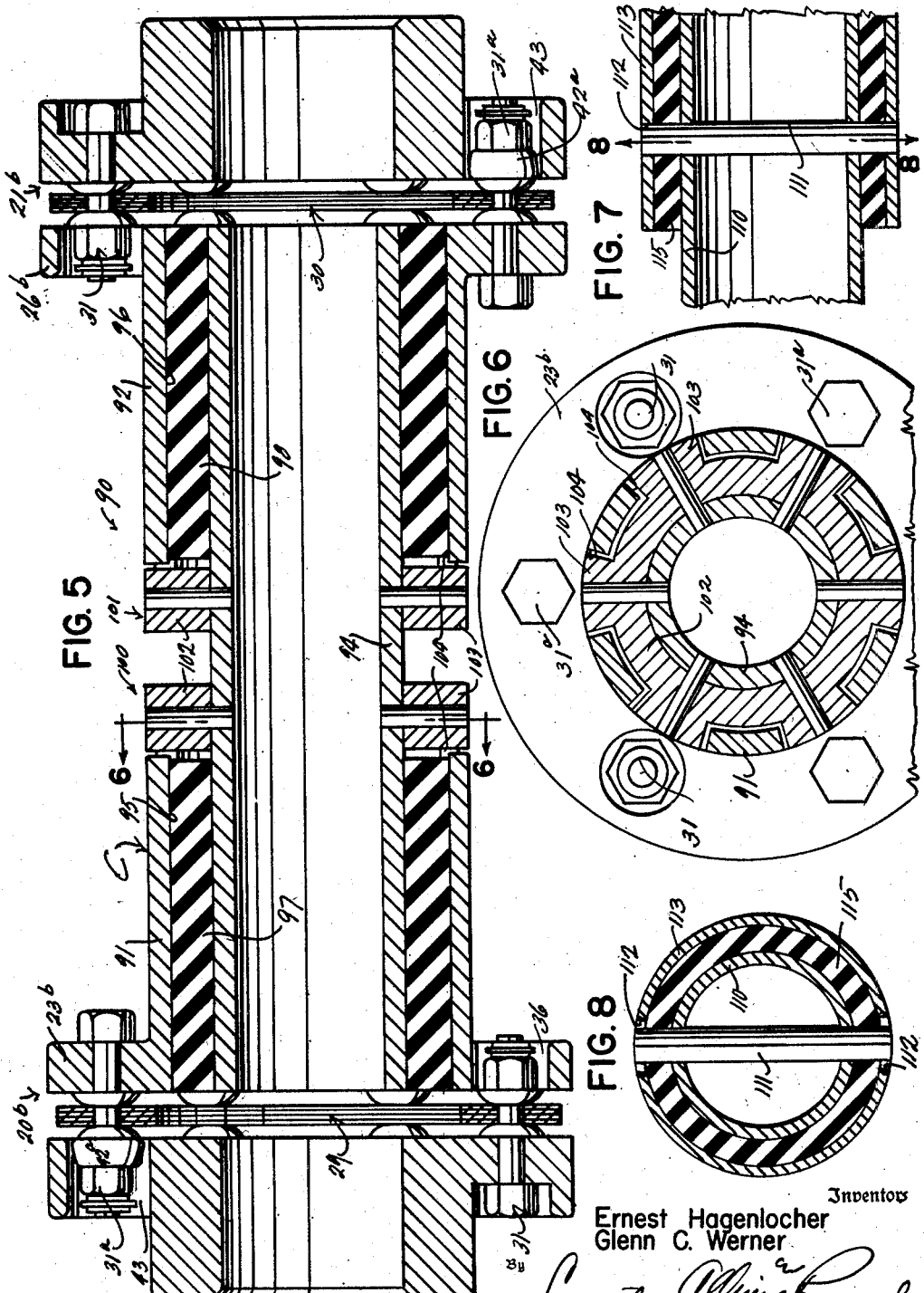

United States Patent Office 2,788,650
Patented Apr. 16, 1957

2,788,650
FLEXIBLE COUPLINGS

Ernest Hagenlocher and Glenn C. Werner, Warren, Pa.

Application March 31, 1952, Serial No. 279,522

2 Claims. (Cl. 64—13)

This invention relates to improvements in flexible coupling structures.

The primary object of this invention is the provision of an improved flexible coupling structure embodying features such as set forth in a co-pending application Serial 617,028 filed September 9, 1945, now Patent No. 2,593,877, and another copending application Serial 271,008 filed February 11, 1952, now Patent No. 2,745,267, embodying improvements thereover in the provision of an improved tubular means for taking care of torsional deflections.

A further object of this invention is the provision of an improved coupling adapted for use in connection with drive and driven shafts of different types of machinery, and capable of compensating for parallel and angular misalignment and free end float between said shafts, and at the same time having connecting means associated therewith which will yield torsionally under the imposition of angular shearing forces.

A further object of this invention is the provision of an improved flexible type coupling structure which includes laminated laterally flexible steel discs between the shaft coupling flanges for the purpose of taking care of misalignment and end float, and additionally incorporates, in different arrangements, torsionally resilient sleeve constructions for taking care of torsional stresses as an incident of relative turning movement between the shafts to which the coupling structure is connected, whereby to absorb and dampen disturbing oscillations, vibrations and shocks incident to rotary motion, and to obviate the transmission of sound and electrical currents.

Other objects and advantages of this invention will be apparent during the course of the following detailed description.

In the accompanying drawings, forming a part of this specification, and wherein similar reference characters designate corresponding parts throughout the several views:

Figure 3 is a longitudinal cross sectional view taken thru a modified form of coupling which has many of the characteristics of the form of coupling shown in Figure 1, but being limited to a singular rotary torsional deflection sleeve.

Figure 4 is a transverse cross sectional view, taken substantially on the line 4—4 of Figure 3, through the motion limiting means for the protection of the rubber torsion sleeve.

Figure 5 is a longitudinal cross sectional view thru another form of invention, showing many of the characteristics of the couplings of Figures 1 and 3, but having a different torsional sleeve arrangement, with independent sleeves for each of the steel disc sets.

Figure 6 is a transverse cross sectional view taken substantially on the line 6—6 of Figure 5.

Figure 7 is a fragmentary longitudinal cross sectional view thru a modified form of angular deflection limiting means.

Figure 8 is a transverse cross sectional view taken substantially upon the line 8—8 of Figure 7.

Figures 1, 2:
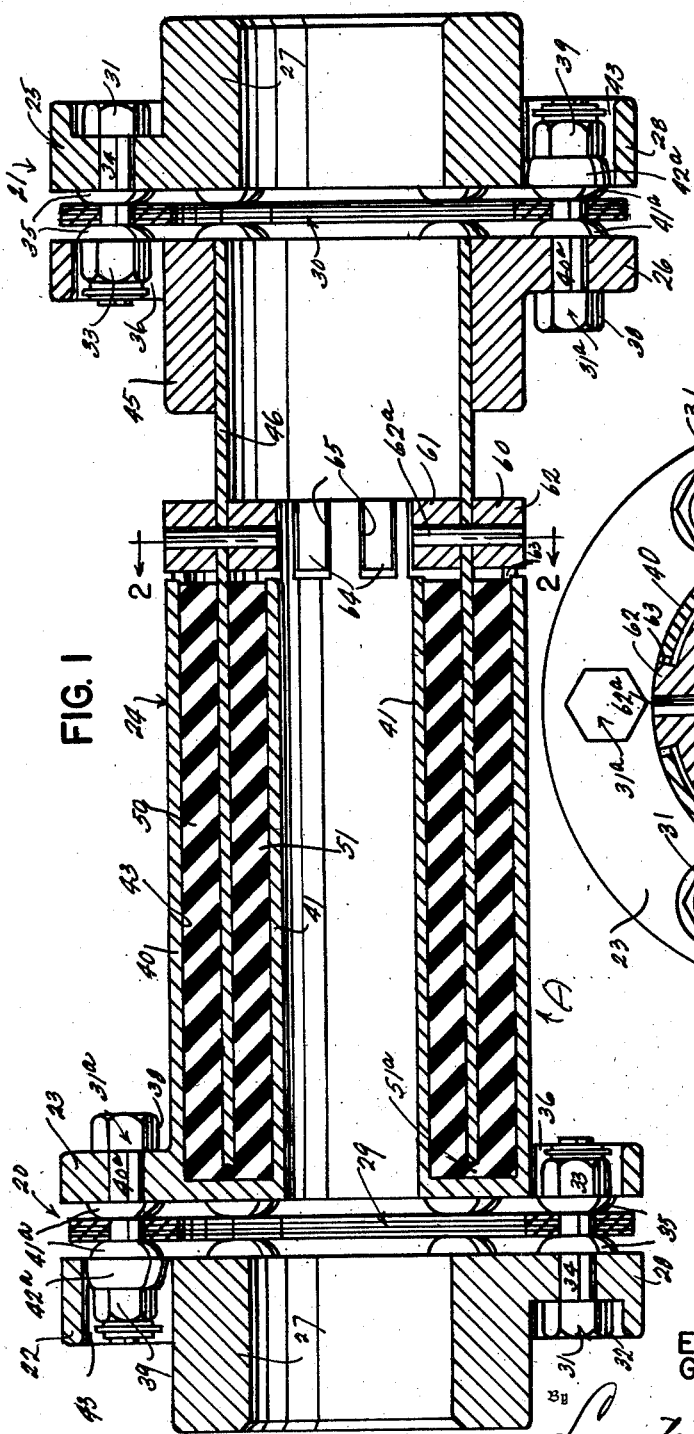
Figure 1 is a longitudinal cross sectional view taken thru one form of improved coupling, utilizing two sets of flexible steel discs; this coupling also embodying an interconnected compound torsionally resilient sleeve structure.
Figure 2 is a transverse cross sectional view, taken substantially on the line 2—2 of Figure 1 thru the improved coupling, and showing motion limiting means to limit the amount of angular deflection of the rubber sleeves, for protection of the latter against failure.

In the drawings, wherein for the purpose of illustration are shown preferred and modified forms of the invention, the letter (A) may generally designate the form of coupling shown in Figures 1 and 2; (B) the type of coupling shown in Figures 3 and 4, and (C) the type of coupling shown in Figures 5 and 6.

In the form of invention A shown in Figures 1 and 2, stainless steel disc coupling structures 20 and 21 are provided for connection to the drive and driven shafts (not shown) of machinery with which the coupling structure A is adapted to be associated. Fundamentally, these coupling structures 20 and 21 are identical, and they embody the characteristics of the coupling structure set forth in U. S. Patent 2,182,711. To that end the coupling structure 20 includes connecting flanges 22 and 23, the latter being part of the intermediate connecting structure 24 forming the torsional deflection structure of the coupling A. Similarly, the coupling arrangement 21 includes the flanges 25 and 26.

The flanges 22 and 25 each include a hub portion 27 and the so-called flange body 28 which receives bolts for connection of the flexible steel disc sets 29 and 30 of the coupling portions 20 and 21 respectively.

The individual discs of the sets 29 and 30 are preferably of stainless steel, or other fatigue resisting material. Individually and in sets they will readily flex laterally to take care of misalignment and end float, but are sufficiently rigid to take the strains and stresses incident to driving of the machinery shafts. These discs may be dialed, as to graining, in the manner set forth in Patent 2,182,711. They are provided with transverse openings to receive bolt sets 31 and 31$^a$ for attachment to the flanges 28 and 23, and the flanges 28 and 26.

The bolt constructions 31 and 31$^a$ are arranged in sets. In the example shown, three of the sets 31 directly connect the flange 28 to the disc set; the other three bolt sets 31$^a$ directly connect the disc set to the flanges 23 or 26, as the case may be.

The bolt sets 31 include the head and nut portions 32 and 33; the shanks 34 being passed thru rounded washers 35 for the clamping of the disc sets 29 and 30 therebetween. The flanges 23 and 26 are provided with openings 36 for receiving the nuts 33, for endwise compactness of the coupling structure.

The bolt sets 31$^a$ also include head and nut portions 38 and 39 and a shank 40$^a$ receiving washers 41$^a$ for the clamping of the disc set therebetween. In addition the shanks 40 are provided with the safety bushings 42$^a$. The latter extend into the openings 43 of the coupling flange bodies 28, as a safety feature to prevent dropping of the parts should fracture of the discs result during operation of the machinery and coupling structure.

Referring to the structure 24 for taking care of torsional stresses on a torsional axis substantially parallel with the axis of rotation of the coupling structure, as an incident of relative turning movement between the coupling parts, whereby to absorb and dampen disturbing oscillations, the same preferably comprises a pair of spaced rigid tubes 40 and 41 coaxially disposed and rigidly connected to the flange 23 and providing an annular space 43 therebetween. These tubes 40 and 41 are of steel or the same material as the flange 23, and integral and preferably coaxial therewith. The other coupling structure 21 is provided with a hub portion 45 having a steel tube 46 connected rigidly therein as by welding or keying. The tube 46 is of a diameter to fit into the space 43 equidistant between the tubes 40 and 41, as shown in Figure 1. Rubber sandwich sleeves 50 and 51 are bonded in the usual manner to the facing surfaces of the tubes 40, 41 and 46, and they lie in the space 43, at opposite sides of the sleeve 46. It is to be noted that the extreme end of the tube 46 terminates short of the flanges 23, and a rubber insulating disc portion 51 is located at this point, preferably integral with the sleeves 50 and 51, as shown.

The rubber sleeves 50 and 51 have sufficient inherent resiliency to take care of torsional shear. The material is the same as is generally used and referred to in the art as "rubber sandwich" material. However, it is to be understood that the term "rubber" as herein used is intended to cover any resilient material capable of satisfying the strains, stresses and conditions imposed thereon; this material being of natural or synthetic rubber or any approved plastic or other material capable of meeting the torsional demands imposed thereon. The Shore durometer may vary according to the torsional loads intended to be carried by the coupling structure. The sleeves 50 and 51 may be vulcanized or otherwise bonded to the annular facing surfaces of the steel tubes 40, 41 and 46 in any approved manner, such as has been outlined in co-pending application Serial 617,028 filed September 9, 1945.

Circular motion limiting means is preferably provided to protect the rubber sleeves 50 and 51 against too severe torsional stresses, and to prevent failure thereof. Such motion limiting means may take variety of forms, and that generally has been set forth in the co-pending application Serial No. 271,008 filed February 11, 1952, as above mentioned. Such means preferably comprises inner and outer annular rings 60 and 61 riveted or otherwise secured at 62$^a$ upon the tube 46 at the inner and outer surfaces thereof and at the ends of the sleeves or tubes 40 and 41. The rings 60 and 61 are each provided with an outer circumferential series of teeth 62 adapted to interfit in slots or recesses 63 provided at the ends of the tubes 40 and 41; the individual width of the teeth 62 being less than the individual width of the slots or recesses 63, to provide some play of the teeth in said slots in order that the sleeves 50 and 51 can take care of torsional deflection between the coupling parts.

The coupling A is capable of taking care of angular and parallel misalignment of the shaft structures, end float and will also take care of torsional deflection.

Referring to the form of invention B shown in Figures 3 and 4, the flexible disc coupling portions 20$^a$ and 21$^a$ have the same characteristics as the coupling structures 20 and 21 of the form of invention A, and the same reference characters have been applied to these parts. The intermediate structure 70, to take care of torsional stresses, is different from the structure 24 of the form of invention A, and includes a pair of rigid tube or sleeve portions 71 and 72 respectively integrally connected with the flanges 23$^a$ and 26$^a$ of the coupling structures 20$^a$ and 21$^a$. The sleeve portions 71 and 72 are coaxially arranged and of different diameters so that the sleeve or tube 72 fits within the sleeve 71 to define an annular space 75 between the outer circumference of the sleeve 72 and the inner circumference of the sleeve 71. In the space 75 is disposed a rubber sleeve 76 which has the characteristics of the rubber sleeves above described for the form of invention A; the same being bonded to the tube portions 71 and 72. Motion limiting means 80 is provided for limiting the amount of play between the tubes 71 and 72, to prevent undue stressing of the rubber sandwich sleeve. It may include an annular ring 81 riveted or otherwise secured by pins 82 upon and to the sleeve 72 externally thereof and at the end of the sleeve 71. The ring 81 is provided with a peripheral arrangement of teeth 83 which fit into slots or recesses 84 provided endwise in the sleeve 71. The width of each tooth 83 is less than the width of the complementary slot 84, and of course this determines the amount of angular movement thru which the rubber sleeve 76 may stress as an incident of torsional deflection.

In the form of invention C, the torsional deflection structure is different. Here the steel disc coupling structures 20$^b$ and 21$^b$ are substantially the same as for the structures 20 and 30 of the form of invention A, and similar parts have been given similar reference characters. The torsion absorbing structure 90 preferably comprises outer tubular steel portions 91 and 92 integral or rigid with the flanges 23$^b$ and 26$^b$ of the coupling structure portions 20$^b$ and 21$^b$ respectively. An inner rigid tube or sleeve 94 is provided, coaxial with and within the tubes 91 and 92; the external surfacing of the sleeve 94 being spaced from the internal surfacing of the tubes 91 and 92 to provide spaces 95 and 96 wherein independent rubber tubes or sleeves 97 and 98 are placed and bonded with and to the sleeves 91—92 and 94 in the same manner as above described for the rubber sandwich sleeves of the forms of invention A and B. The tube 94 is of a single length and extends from the disc set 29 to the disc set 30; being endwise slightly spaced therefrom. In the space between the facing ends of the sleeves or tubes 91 and 92 are disposed motion limiting means 100 and 101 for the sleeves 97 and 98 respectively. They are identical in nature to that described for the motion limiting means of the form of invention B. Each motion limiting means 100 and 101 includes a ring portion 102 externally provided with teeth 103 fitting within slots or ways 104 provided at the extreme ends of the sleeves or tubes 91 and 92. The teeth 103 are slightly less in width than the widths of the slots 104, and this difference determines the amount of torsional deflection.

Other movement limiting means may be provided if so desired, and one modification of this is shown in Figures 7 and 8. Here one of the coupling steel tubes 110, which may be the inner tube, has rigidly connected therewith a diametrically disposed pin 111 the ends of which extend beyond the outer circumferential surfacing of the tube 110 and operate within elongated slots 112 disposed in an outermost steel sleeve 113 which of course is concentric with and spaced from the sleeve 110 to receive a rubber sandwich sleeve 115 therebetween. As is shown in Figure 8, the slots 112 permit end play of the pin 111 therein for the purpose of limiting torsional stresses upon the rubber sandwich 115.

It will be understood that the arrangements of flexible disc sets need not be the same as shown in the various forms of this application, since in some forms of coupling but a single disc set need be provided. Furthermore, the torsionally resilient sleeve arrangement may be applied generally to any coupling structure where it is solely necessary to take care of torsional vibrations, and in such event the disc sets can be done away with.

Various changes in the shape, size and arrangement of parts may be made to the form of invention herein shown and described without departing from the spirit of the invention or scope of the claims.

We claim:

1. In a flexible coupling the combination of shaft attaching flanges, sets of laminated metal discs connected to said flanges, and means connecting said sets together comprising flange portions connected to each of the disc sets and having elongated rigid tubes extending therefrom in axially aligned association, an elongated rigid tube disposed within and interfitting in radially spaced relation within said first-mentioned tubes, and individual rubber sleeves in the tubes first mentioned bonding them to the interfitting tube.

2. In a flexible coupling the combination of shaft attaching flanges, sets of laminated metal discs connected to said flanges, and means connecting said sets of discs together comprising flange portions connected to each of the disc sets and having elongated rigid tubes extending therefrom in axially aligned association, an elongated rigid tube disposed within and interfitting in radially spaced relation with said first mentioned tubes, individual rubber sleeves for the tubes first mentioned bonding them to the interfitting tube, and motion limiting means connected with the interfitting tube and the tubes first mentioned to limit the amount of angular deflection of said rubber sleeves.

References Cited in the file of this patent

UNITED STATES PATENTS

| | | |
|---|---|---|
| 2,394,405 | Schjolin | Feb. 5, 1946 |
| 2,593,877 | Hagenlocher | Apr. 22, 1952 |

FOREIGN PATENTS

| | | |
|---|---|---|
| 532,393 | Great Britain | 1941 |